United States Patent
Dintakurthi et al.

(10) Patent No.: US 11,481,850 B2
(45) Date of Patent: Oct. 25, 2022

(54) TAX BALANCING USING DISTRIBUTED NODE CLUSTERS

(71) Applicant: ADP, Inc., Roseland, NJ (US)

(72) Inventors: Murali Mohan Dintakurthi, Hyderabad (IN); Suryanarayana Akundi, Pasadena, CA (US); Ajit Kumar, San Dimas, CA (US)

(73) Assignee: ADP, Inc., Roseland, NJ (US)

( * ) Notice: Subject to any disclaimer, the term of this patent is extended or adjusted under 35 U.S.C. 154(b) by 142 days.

(21) Appl. No.: 16/458,810

(22) Filed: Jul. 1, 2019

(65) Prior Publication Data

US 2021/0004914 A1   Jan. 7, 2021

(51) Int. Cl.
*G06Q 40/00* (2012.01)
*G06Q 10/06* (2012.01)

(52) U.S. Cl.
CPC ... *G06Q 40/123* (2013.12); *G06Q 10/063114* (2013.01)

(58) Field of Classification Search
CPC .................. G06F 12/0813; G06F 2212/154
USPC ........................................ 705/26, 34
See application file for complete search history.

(56) References Cited

U.S. PATENT DOCUMENTS

| | | | | |
|---|---|---|---|---|
| 8,719,120 B1 * | 5/2014 | McVickar | ............ | G06Q 40/123 705/31 |
| 2002/0184125 A1 * | 12/2002 | Cirulli | ............... | G06Q 40/10 705/26.1 |
| 2011/0288972 A1 * | 11/2011 | Brady | ............... | G06Q 40/00 705/31 |
| 2017/0064027 A1 * | 3/2017 | Grenader | ............. | G06F 16/20 |

FOREIGN PATENT DOCUMENTS

| CN | 106097083 A | * 11/2016 |
|---|---|---|
| CN | 106097083 A | 11/2016 |

OTHER PUBLICATIONS

Dhiman et al., "A Cluster Analysis and Decision Tree Hybrid Approach in Data Mining to Describing Tax Audit," Council for Innovative Research, International Journal of Computers & Technology, vol. 4, No. 1, Jan. 2013, ISSN 2277-3061, pp. 114-119.

(Continued)

*Primary Examiner* — Rokib Masud
(74) *Attorney, Agent, or Firm* — Yee & Associates, P.C.

(57) ABSTRACT

Tax balancing comprising receiving tax balancing requests from a number of clients and distributing each client tax balancing request among a number of nodes comprising a cluster. Nodes are added to the cluster according to processing needs of a client tax balancing request. A number of actors are created within each node for each employee of a client, wherein each actor performs a specified computational task related to tax balancing for the employee, and wherein actors are added to a node according to processing needs of a client tax balancing request, and processing load is balanced within the cluster by redistributing actors from nodes with the highest processing loads to nodes with the lowest processing loads. Employee tax balancing calculations are aggregated for each client, and tax balancing filing and payment data for each client are output to a database.

21 Claims, 6 Drawing Sheets

(56) References Cited

OTHER PUBLICATIONS

Wikipedia, "Akka (toolkit)," Wikimedia Foundation, Inc., last edited May 10, 2019, accessed May 30, 2019, 4 pages. https://enwikipedia.org/wiki/Akka_(toolkit).

Wikipedia, "Actor model," Wikimedia Foundation, Inc., last edited May 23, 2019, accessed May 30, 2019, 11 pages. https://en.wikipedia.org/wiki/Actor_model.

"Cluster Usage," Akka Documentation, Version 2.5.23, retrieved May 30, 2019, 23 pages. https://doc.akka.io/docs/akka/current/cluster-usage.html?language=java.

"Persistence," Akka Documentation, Version 2.5.23, retrieved May 30, 2019, 42 pages. https://doc.akka.io/docs/akka/current/persistence.html.

* cited by examiner

TAX BALANCING USING DISTRIBUTED NODE CLUSTERS

BACKGROUND INFORMATION

1. Field

The present disclosure relates generally to an improved computer system and, in particular, to scalable tax balancing using distributed node clusters implemented in an Actor Model.

2. Background

In most jurisdictions, employers are required to perform period tax balancing, typically quarterly and/or annually. Tax filings and payments are then based on the balancing results.

Payroll tax clients' employee head counts can vary between 20 and 100,000. Tax balancing typically comprises two steps, importing tax data and reconciling tax balances. With current software implementations, importing tax employee data takes approximately one (1) second per employer for small clients have approximately 25 employees. For larger tax clients having employee head counts in the 30,000 range, importation of employee tax data requires approximately 60 minutes per employer.

SUMMARY

An illustrative embodiment provides a computer-implemented method for tax balancing. The method comprises receiving tax balancing requests from a number of clients and distributing each client tax balancing request among a number of nodes comprising a cluster. Nodes are added to the cluster according to processing needs of a client tax balancing request. A number of actors are created within each node for each employee of a client, wherein each actor performs a specified computational task related to tax balancing for the employee. Actors are added to a node according to processing needs of a client tax balancing request. Processing load is balanced within the cluster by redistributing actors from nodes in the cluster with the highest processing loads to nodes in the cluster with the lowest processing loads Employee tax balancing calculations are aggregated for each client, and tax balancing filing and payment data for each client are output to a database.

Another illustrative embodiment provides a system for tax balancing comprising a bus system; a storage device connected to the bus system, wherein the storage device stores program instructions; and a number of processors connected to the bus system, wherein the number of processors execute the program instructions to: receive tax balancing requests from a number of clients; distribute each client tax balancing request among a number of nodes comprising a cluster, wherein nodes are added to the cluster according to processing needs of a client tax balancing request; create a number of actors within each node for each employee of a client, wherein each actor performs a specified computational task related to tax balancing for the employee, and wherein actors are added to a node according to processing needs of a client tax balancing request, and wherein processing load is balanced within the cluster by redistributing actors from nodes in the cluster with the highest processing loads to nodes in the cluster with the lowest processing loads; aggregate employee tax balancing calculations for each client; and output tax balancing filing and payment data for each client to a database.

Another illustrative embodiment provides a computer program product for tax balancing comprising a non-volatile computer readable storage medium having program instructions embodied therewith, the program instructions executable by a number of processors to cause the computer to perform the steps of: receiving tax balancing requests from a number of clients; distributing each client tax balancing request among a number of nodes comprising a cluster, wherein nodes are added to the cluster according to processing needs of a client tax balancing request; creating a number of actors within each node for each employee of a client, wherein each actor performs a specified computational task related to tax balancing for the employee, and wherein actors are added to a node according to processing needs of a client tax balancing request, and wherein processing load is balanced within the cluster by redistributing actors from nodes in the cluster with the highest processing loads to nodes in the cluster with the lowest processing loads; aggregating employee tax balancing calculations for each client; and outputting tax balancing filing and payment data for each client to a database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that organizations have to tax balance at regular intervals. Tax balancing requires the importation and reconciliation of employee tax data. Employer's might have an employee head count ranging from very small (e.g., 20) to very large (e.g., 100,000+).

The illustrative embodiments further recognize and take into account that importation and reconciliation of employee data can range from approximately one second per employer for small head counts of a few dozen to over 60 minutes per employer for large head counts of 100,000 or more. Therefore, current tax balancing software approaches do not scale, resulting in throughput and performance reduction that can delay tax filings and payments for large organizations.

Illustrative embodiments provide a method and system for tax balancing implemented in an Actor Model for better scalability and performance. The solution uses the AKKA toolkit to implement an Actor Model. The Actor Model makes efficient use of threads in a Java virtual machine (JVM) and all of its cores. If needed, it can scale horizontally across machines.

Figure 1:
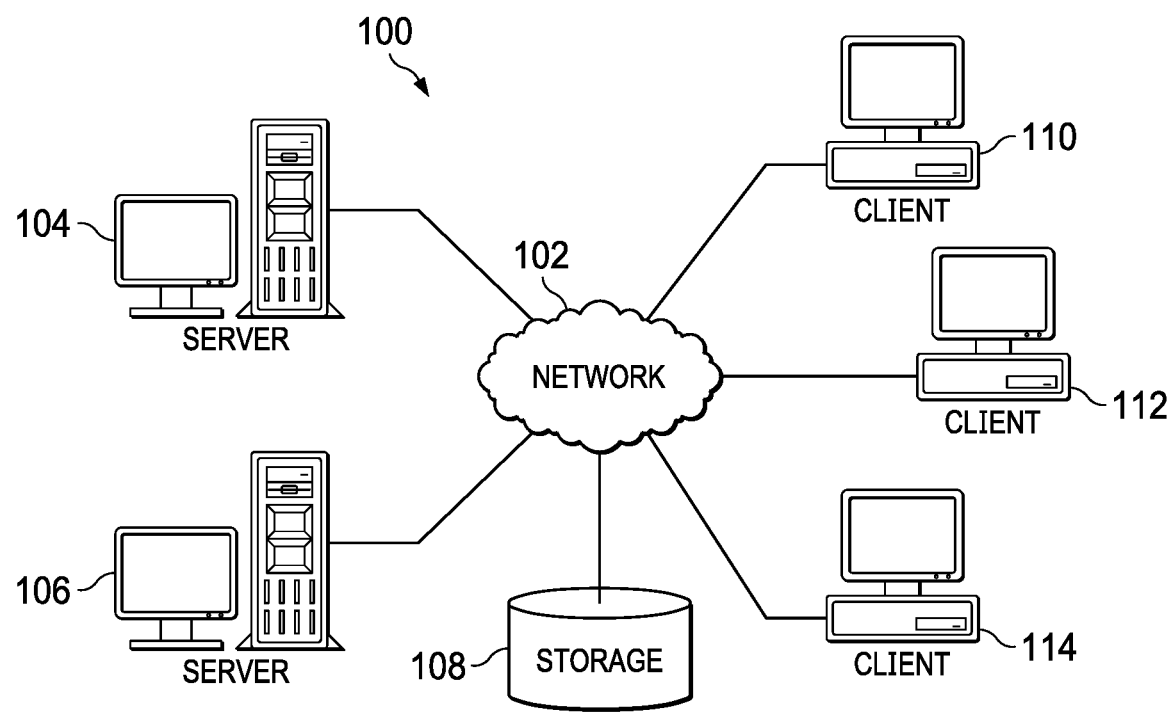
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
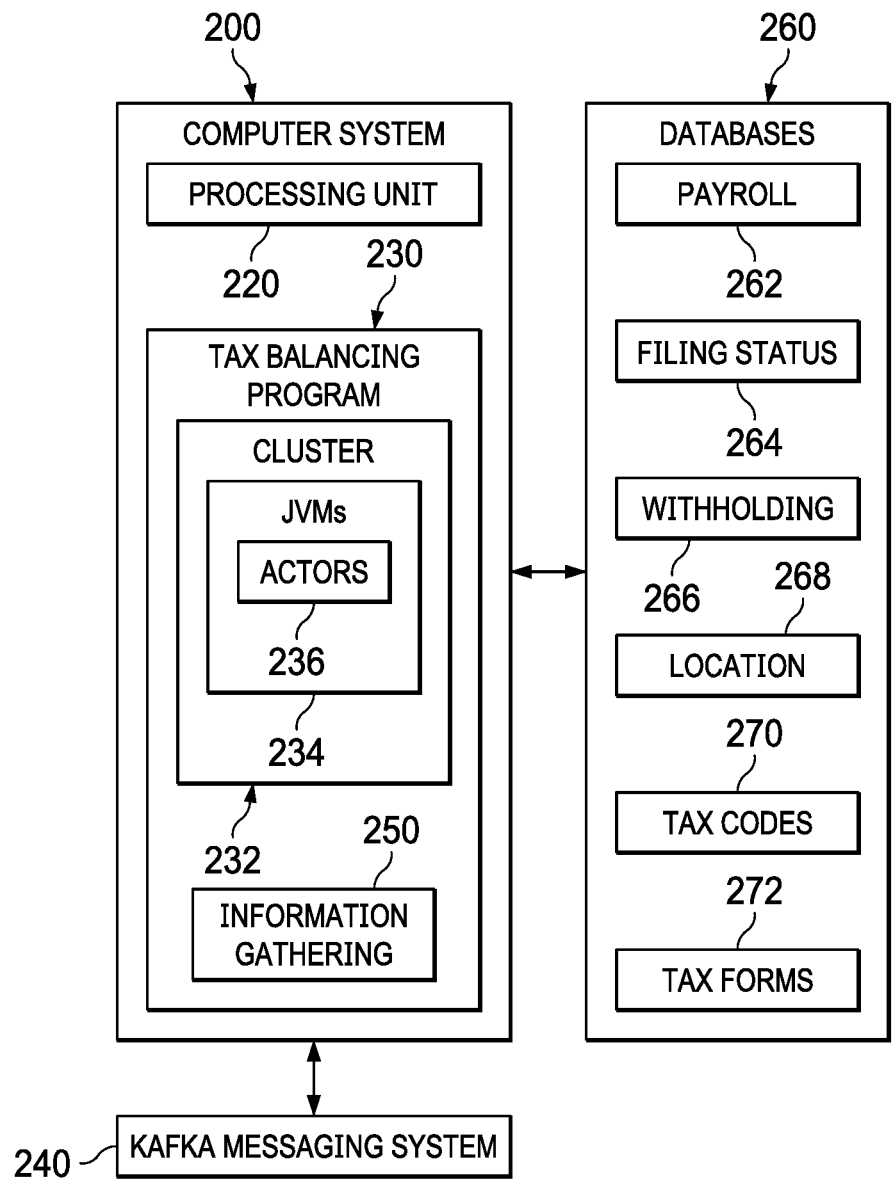
FIG. 2 is a block diagram of a computer system for tax balancing in accordance with an illustrative embodiment.

Turning to FIG. 2, a block diagram of a computer system for modeling is depicted in accordance with an illustrative embodiment. Computer system 200 is connected to databases 260, and Kafka messaging system 240. Databases 260 comprise payroll 262, filing status of employees 264, tax withholdings 266, location 268, tax codes for the jurisdictions in which the employees reside 270, and corresponding tax forms for filing 272.

Computer system 200 comprises information processing unit 220 and tax balancing program 230. In an embodiment, processing unit 216 comprises one or more conventional general purpose central processing units (CPUs).

Computer system 200 is connected to Kafka messaging system 240. Kafka messaging system 240 provides a queue for requests. This queue provides throttle of input flow into the back-end system.

Tax balancing program 230 comprises information gathering 252, tax balancing cluster 232, a number of JVMs 234 within the cluster, and a number of actors 236 within each JVM. Information gathering 250 is configured to gather data from databases 260.

Thus, processing unit 216 and tax balancing program 230 transform a computer system into a special purpose computer system as compared to currently available general computer systems that do not have a means to perform tax balancing such as computer system 200 of FIG. 2. Currently used general computer systems do not have a means to tax balancing with scalability.

Figure 3:
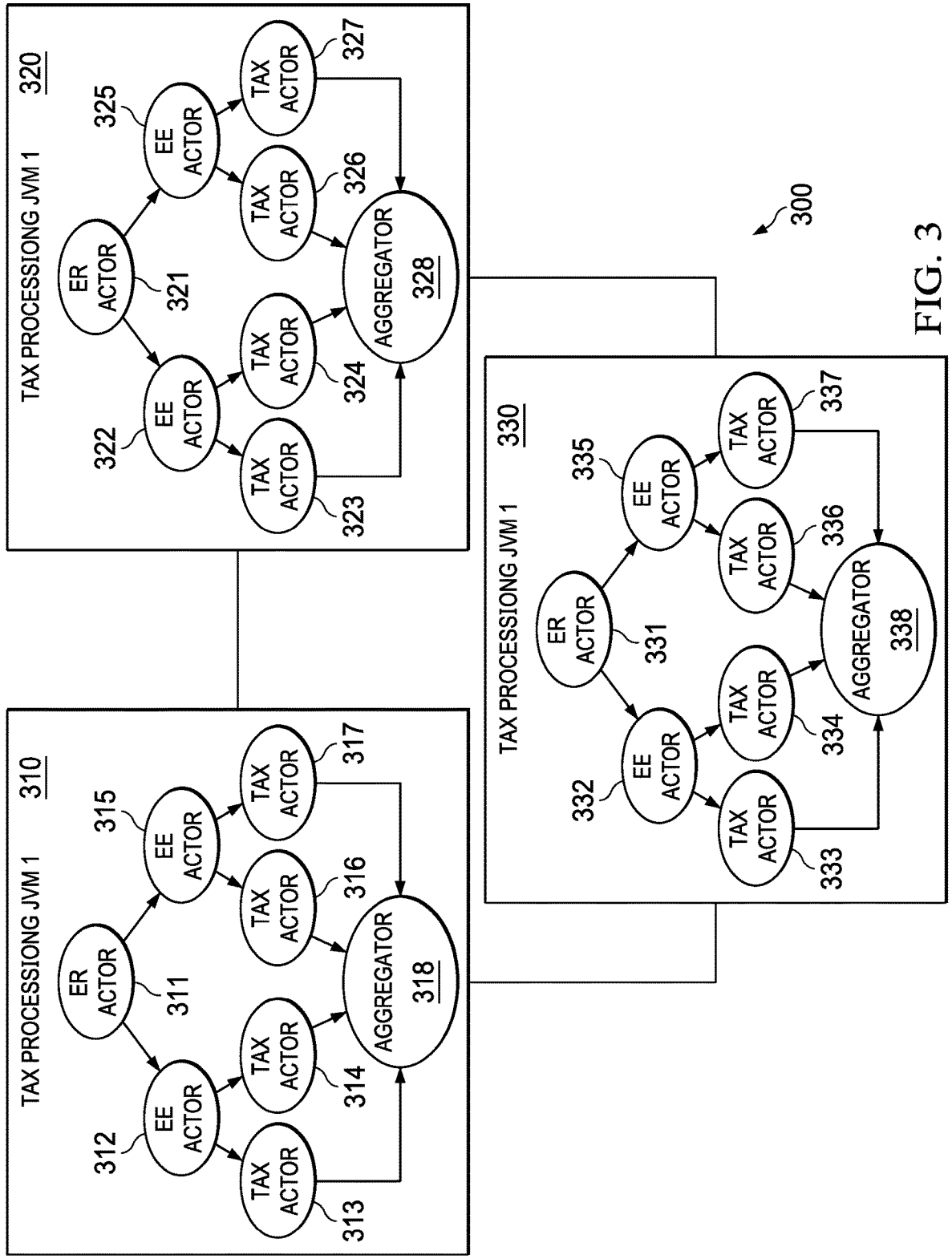
FIG. 3 depicts a cluster of JVM nodes in which illustrative embodiments can be implemented.

FIG. 3 depicts a cluster of JVM nodes in which illustrative embodiments can be implemented. In the illustrated example, cluster 300 comprises three nodes 310, 320, 330. In an embodiment, the cluster 300 is an Akka cluster, and the tax processing nodes 310, 320, 330 are JVMs.

A JVM is a virtual that emulates a computer system in software to provide the functionality of a physical computer. JVMs can run Java programs as well as programs written in other languages that are compiled to Java bytecode.

Akka is a toolkit and runtime that facilitates the construction of concurrent and distributed applications on JVMs, particularly using actor-based concurrency. This concurrency is message-based and asynchronous.

Each JVM node 310, 320, 330 comprises a number of actors 311-318, 321-328, 331-338, respectively, organized hierarchically for the client according to the Actor Model. In Actor Model, each actor is an entity that performs a specific computational task concurrently with other actors. In response to a message, an actor can send messages to other actors, create a number of new actors, and/or determine the appropriate behavior for the next message it receives. These tasks can be performed concurrently in parallel within a single actor. A benefit of the Actor Model is that it allows computations resources to be used more efficiently by breaking a task into a number of small pieces.

Within an Akka cluster, actors communicate with each whether they are on the same host (JVM) or separate hosts. They can communicate either directly or through routing facilities. In hierarchical arrangement a failure is treated as an event that is handled by an actor's supervisor.

Using tax processing JVM 1 310 as an example, an actor 311 is created for the employer/client submitting the tax balancing request. Separate actors 312, 315 are created for each employee of the client. For each employee a number of tax actors 313, 314, 316, 317 are created to handle respective tax balancing computational task for the employee in question. In illustrative embodiments, the computational tasks performed by the actors can comprise, without limitation, tax code validation, gathering tax items from tax forms, calculations of amounts, comparison of actual taxes owed with estimated taxes for designated time periods, and storing data in a database for further processing.

The tax balancing data calculated by the various actors in the node are then combined by an aggregator actor 318 for output to a database. The other nodes 320, 330 in the cluster 300 are organized along similar lines.

It should be emphasized that FIG. 3 is a simplified representation of an Akka cluster, and that the number of actors in a given JVM node is likely to be much larger than that shown. The depiction in FIG. 3 is presented for ease of illustration.

Figure 4:
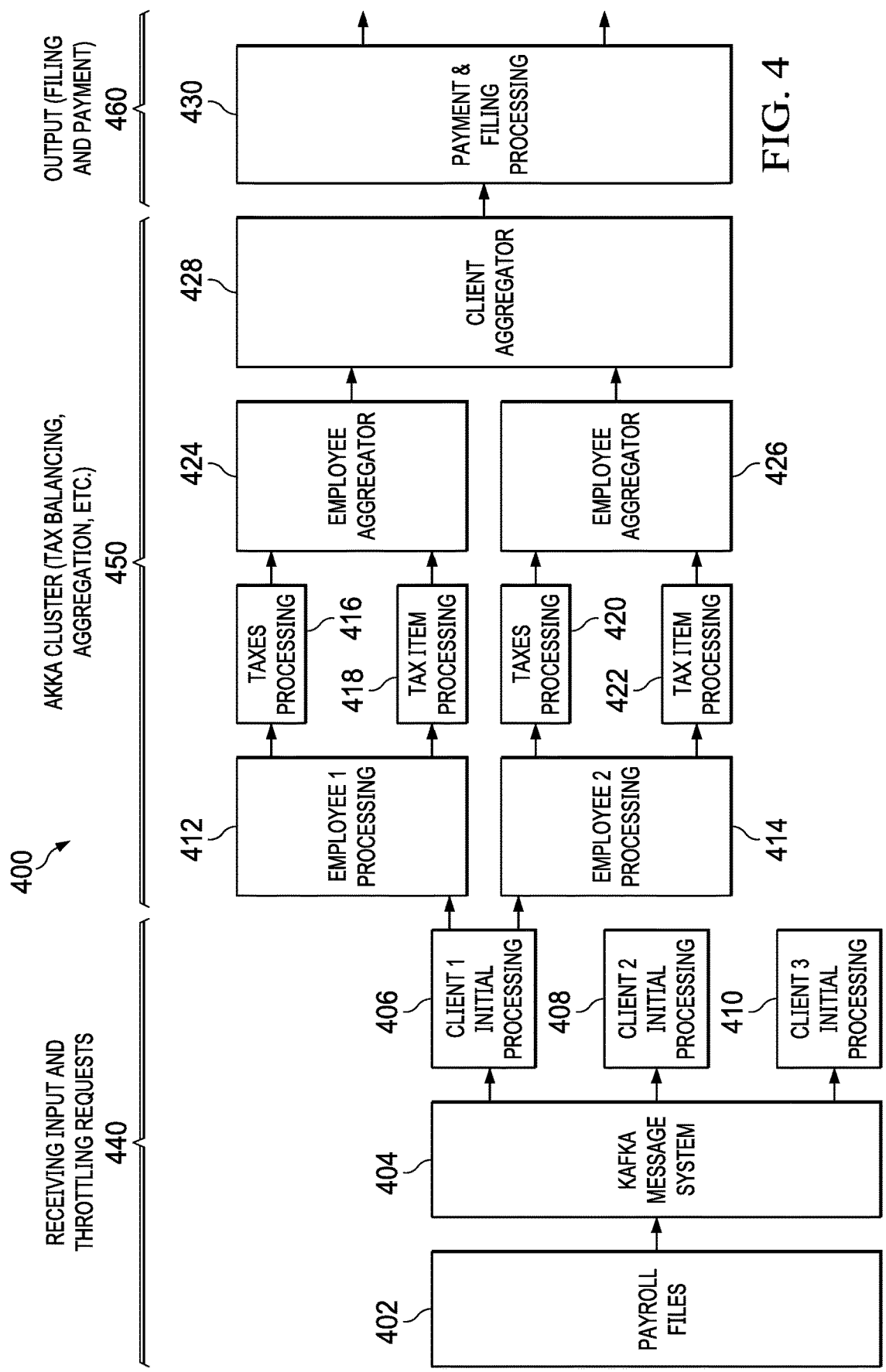
FIG. 4 depicts an architecture for tax balancing in accordance with illustrative embodiments.

FIG. 4 depicts an architecture for tax balancing in accordance with illustrative embodiments. Architecture 400 comprises three main elements, input and throttling 440, Akka clusters 450, and output 460.

Input and throttling 440 comprises receiving tax balancing requests comprising input of payroll files 402 from a number of clients/employers. The requests are fed to Kafka message system 404, which throttles the input flow of data so that input is passed in a controlled way to the back end of the system for further processing. Kafka is a stream-processing platform that provides real-time streaming between systems or applications. It typically is run on a cluster of servers that can span multiple datacenters. A Kafka message system stores streams of records in categories called topics. Each record comprises a key, a value, and a timestamp.

In the illustrated example, there are three clients 406, 408, 410 submitting tax balancing requests. Each message in the Kafka queue represents one client, including a header, employee tax data (i.e. employee1 . . . employeeN).

Each client message in the queue is then fed into the Akka cluster section 450, which can be a cluster of JVMs such as cluster 300 in FIG. 3. For ease of illustration, a very simple cluster is depicted in FIG. 4 for client 1 406. With the cluster an actor is created for each employee of the client. In the present example, employee 1 and employee 2 are represented by actors 412 and 414. For each employee a taxes processing actor 416, 420 is created, as well as tax item processing actors 418, 422. The actors can be created in, and redistributed to, any node within the cluster for the client.

Actors in the cluster 450 handle computational tasks related to tax balancing. Such computation tasks include, without limitation, tax code validations, calculations of amounts, comparison between actual taxes and quarter end taxes (tax vs qtd tax), and gathering tax items such as tax form (e.g., W2) entries/box items, hours worked, Social Security Number (or equivalent), and other identifying and tax-relevant items. The actors also store all these data in a database for further processing.

Data from the different actors for each employee are then aggregated by an employee aggregator actor 424, 426, and a client aggregator 428 aggregate all of the tax balancing data for the different employees of the client.

The aggregated tax balancing data for the client is then output in section 460 such as to a database for payment and filing processing 430.

Figure 5:
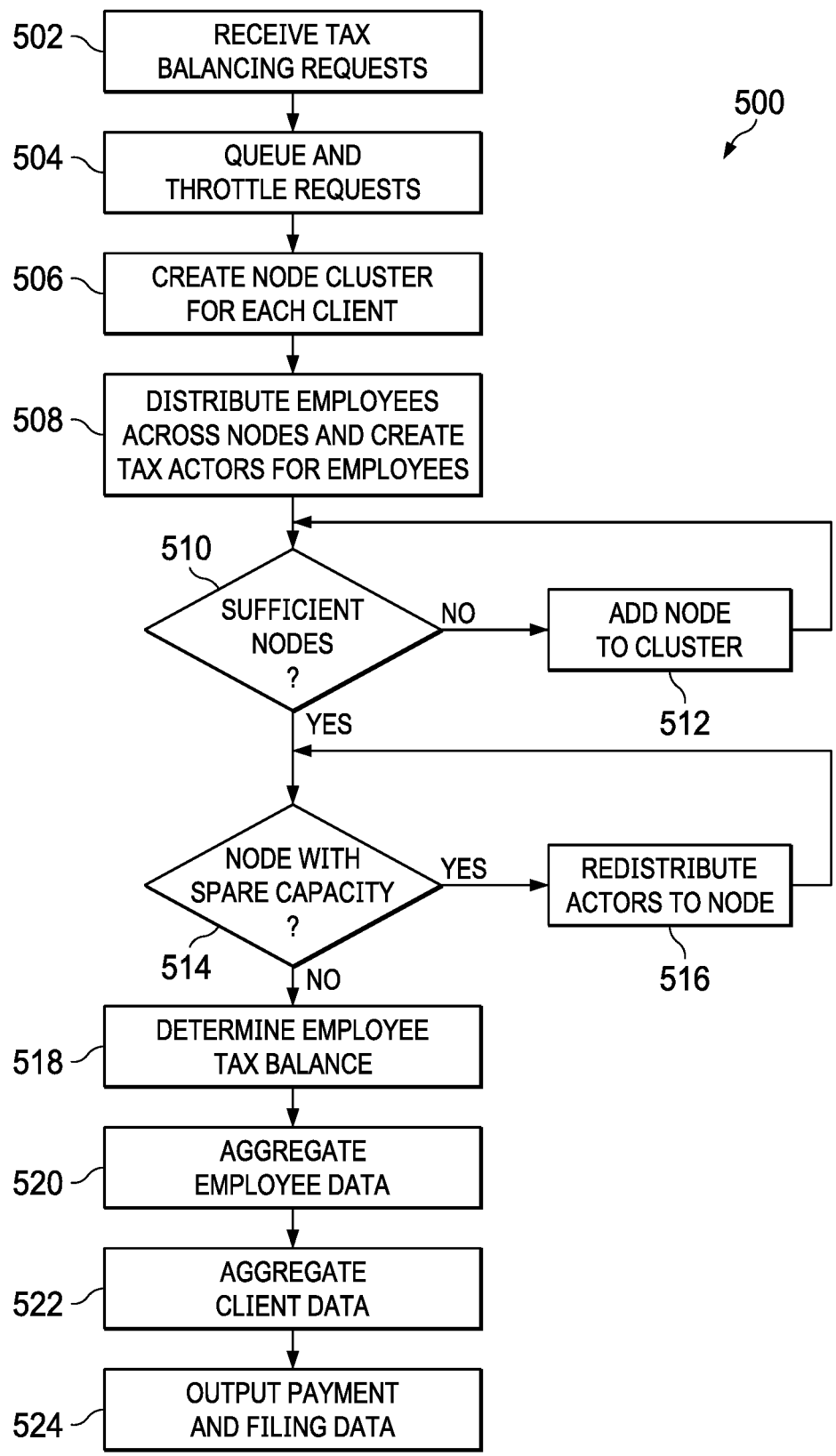
FIG. 5 depicts a process flow for tax balancing using JVM clusters in accordance with illustrative embodiments.

FIG. 5 depicts a process flow for tax balancing using JVM clusters in accordance with illustrative embodiments. Process 500 begins by receiving tax balancing requests from a number of clients (employers) (step 502). These requests are then queued to throttle the input flow into the back-end system (step 504). In an embodiment, this queue is in a Kafka system.

The back-end system creates a cluster of JVM nodes for each client (step 506). In an embodiment, the cluster is an Akka cluster. For each client, the tax balancing request is distributed among the nodes in the cluster.

Data for employees of the client are distributed across the nodes within the cluster, and tax actors are created for each employee within the node to which the employee is assigned (step 508). Each actor performs a specified computational task related to tax balancing for the employee. Actors are added to a node according to the processing needs (e.g., number of employees) of the client tax balancing request.

Each JVM in the cluster has maximum processing capacity. Therefore, in distributing employee tax data across the nodes in the cluster, process 500 also determines if there are enough nodes in the cluster to handle the total processing load (step 510). If there are not enough nodes, the back-end system adds more JVM nodes to the cluster until there is sufficient processing capacity in the cluster to handle the tax balancing request for that client (step 512).

If there are sufficient nodes within the cluster, process 500 also determines if there any nodes within the cluster with spare capacity (step 514). Process 500 seeks to balance processing loads across all of the nodes in the cluster as evenly as possible. Therefore, if any nodes within the cluster have a processing load lower than other nodes by a specified threshold difference, processing load is balanced within the cluster by redistributing actors from nodes in the cluster with the highest processing loads to nodes in the cluster with the lowest processing loads (step 516).

The tax actors determine the tax balance for each employee of the client (step 518). Each employee has a number of actors. Some actors determine applicable tax code provisions for specific jurisdictions into which the employee falls. Other actors process specific tax items (i.e. tax form entries), and other actors might handle calculations by applying the appropriate tax provision to a given tax item.

The data processed by the different tax actors for a given employee are aggregated (step 520), and the tax balancing data for all of the employees of the client/employer are aggregated (step 522). The tax balancing filing and payment data for each client are then output to a database (step 524).

Figure 6:
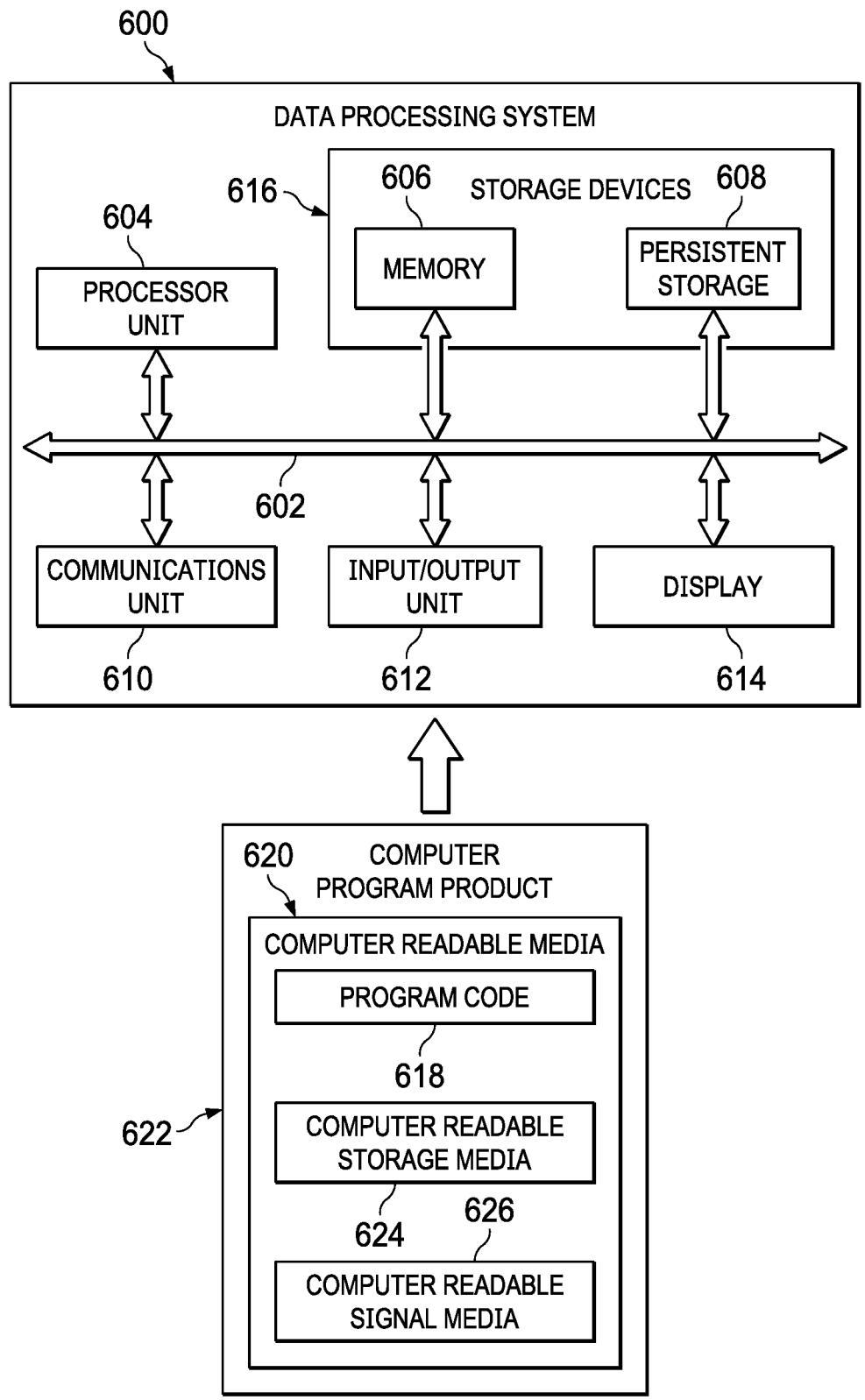
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement one or more computers and client computer system 112 in FIG. 1. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general purpose central processing units (CPUs). In an alternate embodiment, processor unit 604 comprises a number of graphical processing units (CPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 616, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Alternatively, program code 618 may be transferred to data processing system 600 using computer-readable signal media 626.

Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for tax balancing of employee payroll taxes, the method comprising:
   receiving, by a number of processors, tax balancing requests from a plurality of clients, wherein each client is an employer of multiple employees, wherein each employer processes payroll taxes for each of its multiple employees, and wherein processing for each tax balancing request comprises importing employee tax data of each of the multiple employees of each employer and reconciling the employee tax data that is imported;
   distributing, by a number of processors, each client tax balancing request among a plurality of nodes comprising a cluster, wherein nodes are added to the cluster according to processing needs of a client tax balancing request;
   creating, by a number of processors, a plurality of actors within each node of the cluster for each employee of a client, wherein each actor performs a specified employee tax balancing calculation related to tax balancing for the employee, and wherein actors are added to a node according to processing needs of a client tax balancing request, and wherein processing load is balanced within the cluster by redistributing actors from nodes in the cluster with a highest processing loads to nodes in the cluster with lowest processing loads;
   aggregating, by a number of processors, employee tax balancing calculations for each client; and
   outputting, by a number of processors, tax balancing filing and payment data for each client to a database.

2. The method of claim 1, further comprising throttling the tax balance requests from the clients in a queue.

3. The method of claim 1, wherein the tax balancing requests are received by a Kafka messaging system.

4. The method of claim 1, wherein the nodes are Java virtual machines (JVMs).

5. The method of claim 1, wherein the cluster is an AKKA cluster.

6. The method of claim 1, wherein computational tasks performed by the actors comprise one or more of:
   tax code validation;
   gathering tax items from tax forms;
   calculations of amounts;
   comparison of actual taxes owed with estimated taxes for designated time periods; or
   storing data in a database for further processing.

7. The method of claim 1, wherein a plurality of actors are organized hierarchically for each client.

8. A system for tax balancing, the system comprising:
   a bus system;
   a storage device connected to the bus system, wherein the storage device stores program instructions; and
   a number of processors connected to the bus system, wherein the number of processors execute the program instructions to:
      receive tax balancing requests from a plurality of clients, wherein each client is an employer of multiple employees, wherein each employer processes payroll taxes for each of its multiple employees, and wherein processing for each tax balancing request comprises importing employee tax data of each of the multiple employees of each employer and reconciling the employee tax data that is imported;
      distribute each client tax balancing request among a plurality of nodes comprising a cluster, wherein nodes are added to the cluster according to processing needs of a client tax balancing request;
      create a plurality of actors within each node of the cluster for each employee of a client, wherein each actor performs a specified employee tax balancing calculation related to tax balancing for the employee, and wherein actors are added to a node according to processing needs of a client tax balancing request, and wherein processing load is balanced within the cluster by redistributing actors from nodes in the cluster with a highest processing loads to nodes in the cluster with a lowest processing loads;
      aggregate employee tax balancing calculations for each client; and
      output tax balancing filing and payment data for each client to a database.

9. The system of claim 8, wherein the number of processors further execute program instructions to throttle the tax balance requests from the clients in a queue.

10. The system of claim 8, wherein the tax balancing requests are received by a Kafka messaging system.

11. The system of claim 8, wherein the nodes are Java virtual machines (JVMs).

12. The system of claim 8, wherein the cluster is an AKKA cluster.

13. The system of claim 8, wherein computational tasks performed by the actors comprise one or more of:
- tax code validation;
- gathering tax items from tax forms;
- calculations of amounts;
- comparison of actual taxes owed with estimated taxes for designated time periods; or
- storing data in a database for further processing.

14. The system of claim 8, wherein a number of actors are organized hierarchically for each client.

15. A computer program product for tax balancing, the computer program product comprising:
- a non-volatile computer readable storage medium having program instructions embodied therewith, the program instructions executable by a number of processors to cause the computer to perform the steps of:
  - receiving tax balancing requests from a plurality of clients, wherein each client is an employer of multiple employees, wherein each employer processes payroll taxes for each of its multiple employees, and wherein processing for each tax balancing request comprises importing employee tax data of each of the multiple employees of each employer and reconciling the employee tax data that is imported;
  - distributing each client tax balancing request among a plurality of nodes comprising a cluster, wherein nodes are added to the cluster according to processing needs of a client tax balancing request;
  - creating a plurality of actors within each node of the cluster for each employee of a client, wherein each actor performs a specified employee tax balancing calculation related to tax balancing for the employee, and wherein actors are added to a node according to processing needs of a client tax balancing request, and wherein processing load is balanced within the cluster by redistributing actors from nodes in the cluster with a highest processing loads to nodes in the cluster with a lowest processing loads;
  - aggregating employee tax balancing calculations for each client; and
  - outputting tax balancing filing and payment data for each client to a database.

16. The computer program product of claim 15, further comprising instructions for throttling the tax balance requests from the clients in a queue.

17. The computer program product of claim 15, wherein the tax balancing requests are received by a Kafka messaging system.

18. The computer program product of claim 15, wherein the nodes are Java virtual machines (JVMs).

19. The computer program product of claim 15, wherein the cluster is an AKKA cluster.

20. The computer program product of claim 15, wherein computational tasks performed by the actors comprise one or more of:
- tax code validation;
- gathering tax items from tax forms;
- calculations of amounts;
- comparison of actual taxes owed with estimated taxes for designated time periods; or
- storing data in a database for further processing.

21. The computer program product of claim 15, wherein a number of actors are organized hierarchically for each client.

* * * * *